United States Patent [19]
Strisower

[11] Patent Number: 5,809,482
[45] Date of Patent: Sep. 15, 1998

[54] SYSTEM FOR THE TRACKING AND MANAGEMENT OF TRANSACTIONS IN A PIT AREA OF A GAMING ESTABLISHMENT

[75] Inventor: John M. Strisower, Chico, Calif.

[73] Assignee: Harrah's Operating Company, Inc., Memphis, Tenn.

[21] Appl. No.: 299,514

[22] Filed: Sep. 1, 1994

[51] Int. Cl.$^6$ .................................................. G06F 17/60
[52] U.S. Cl. ............................................................. 705/30
[58] Field of Search ................................... 235/380, 375, 235/383; 364/401 M, 406; 395/230

[56] References Cited

U.S. PATENT DOCUMENTS

| | | | |
|---|---|---|---|
| 3,124,674 | 3/1964 | Edwards et al. | 235/61.1 |
| 4,072,930 | 2/1978 | Lucero et al. | 340/152 T |
| 4,283,709 | 8/1981 | Lucero et al. | 340/147 R |
| 4,339,798 | 7/1982 | Hedges et al. | 364/412 |
| 4,373,726 | 2/1983 | Churchill et al. | 273/138 A |
| 4,467,424 | 8/1984 | Hedges et al. | |
| 4,494,197 | 1/1985 | Troy et al. | 364/412 |
| 4,531,187 | 7/1985 | Uhland | 463/12 |
| 4,636,951 | 1/1987 | Harlick | 364/412 |
| 4,669,730 | 6/1987 | Small | 273/138 A |
| 4,755,941 | 7/1988 | Bacchi | 364/412 |
| 4,814,589 | 3/1989 | Storch | 235/375 |
| 4,882,473 | 11/1989 | Bergeron et al. | 235/380 |
| 4,926,327 | 5/1990 | Sidley . | |
| 5,038,022 | 8/1991 | Lucero . | |
| 5,103,081 | 4/1992 | Fisher et al. | 235/464 |
| 5,159,549 | 10/1992 | Hallman, Jr. et al. . | |
| 5,166,502 | 11/1992 | Rendleman | 235/492 |
| 5,179,517 | 1/1993 | Sarbin et al. | 364/410 |
| 5,249,800 | 10/1993 | Hilgendorf et al. | 273/138 A |
| 5,276,312 | 1/1994 | McCarthy | 235/380 |
| 5,283,422 | 2/1994 | Storch | 235/375 |
| 5,321,241 | 6/1994 | Craine | 235/380 |
| 5,326,104 | 7/1994 | Pease et al. | 273/138 A |
| 5,371,345 | 12/1994 | LeStrange et al. | 235/380 |

OTHER PUBLICATIONS

David H. Freedman, Odds Man In, Forbes(FBR), Supplement, 4 pages, Oct. 25, 1993.
Pat Becker, "Gambling LAN (Foxwoods High Stakes Bingo and Casino Utilizes Local Area Network, Computer Systems)," LAN Magazine, vol. 7, No. 11, 4 pages (Nov. 1992).

Primary Examiner—Edward R. Cosimano
Assistant Examiner—Phillip Groutt
Attorney, Agent, or Firm—Fenwick & West LLP

[57] ABSTRACT

A system and method automatically tracks player gambling transactions in a casino. The system includes a casino database the stores betting summary records for each of a plurality players, where each betting summary record is associated with a player identification code, and includes the player's betting rating. One or more gaming tables have a plurality of player positions and a plurality of code readers. A code reader initiates a betting session in response to reading a player identification card encoded with a player identification code. A communications network couples the casino database and gaming table to an automatic tracking and management unit (ATMU). The ATMU has a display unit, and is coupled to the code readers at the gaming table to receive a player identification code for a player at the initiation of a betting session. The ATMU retrieves from the casino database the betting summary record of the player, and displays it to pit personnel at the gaming table on the display unit. The ATMU also collects real time data of the player's betting transactions, including the player's identification code, and an average bet by the player during the betting session. The ATMU updates the betting summary record with the collected real time data for the player, and provides the updated betting summary record to the casino database via the communications network.

18 Claims, 13 Drawing Sheets

SYSTEM FOR THE TRACKING AND MANAGEMENT OF TRANSACTIONS IN A PIT AREA OF A GAMING ESTABLISHMENT

FIELD OF THE INVENTION

The present invention is directed toward a tracking system for gaming transactions in the pit area of a gaming establishment and more particularly to an automatic player tracking and table game accounting system utilized in the pit area of a casino.

BACKGROUND OF THE INVENTION

In an analogy to frequent flyer programs that have been introduced by various airline carriers, oftentimes casinos provide frequent player incentives to casino players who play certain games at high betting levels. For example, a player bets at a certain dollar level (perhaps $100). To encourage continued betting at this level, a fraction of a theoretical win or a portion of the amount the person is playing will be applied to other activities within that particular organization.

A casino owner would like to track and manage transactions and player marketing data in a pit area of the casino. If a person plays a certain amount of money on a game like blackjack, there will be discounts provided for the hotel room or there may be a free hotel room.

Cards with magnetic strips or punched holes are used in the gaming tables of the pit area. The cards are typically utilized for tracking of players and their transactions within the casino.

Typically, a system for tracking transactions in a pit area of a casino is a manual paper-based one. In such a system, an employee in a pit area, typically the pit boss, writes down the betting levels called the bet rating of the players. The pit personnel must spend a considerable amount of time recording the transactions for later entry by the pit clerk. The bet rating is defined as the pit boss' best guess as to the player's betting level over time. This double entry results in errors and delays. Additionally, pit personnel spend an inordinate amount of time ensuring that proper credit is given to the respective players. Therefore, known manual systems are cumbersome and do not provide for true two way interactive performance.

In existing automated slot machine tracking systems, actual betting transactions in the gaming area are tracked. In the table gaming area of the casino (blackjack, craps and roulette) the betting rate of a player over a particular period of time is recorded manually as opposed to being transaction based. The actual transactions presently are not being recorded by the pit personnel.

Accordingly, what is needed is a transaction tracking and management system that is two way and provides for real time interactivity. The tracking and management system should also be completely automatic and should eliminate the paper associated with bet rating and the like that is required in known systems.

The tracking and management system should be one which is readily adaptable to be utilized with existing casino databases to assure a seamless and integrated information system. The tracking and management system should also allow the personnel within the casino area to be free to perform other activities besides physically recording the transactions. It would be useful to provide a system in which the personnel would be able to interact more readily with the players. Accordingly, the present invention satisfies such a need. In phase one of the invention, we replace the paper-based rating and game accounting systems with fully automated real time systems. In phase two, fully automated bet by bet recording eliminates the need for pit personnel to watch and rate the player's action.

SUMMARY OF THE INVENTION

An automatic tracking and information management system (ATMS) is provided that automatically determines various player transactions associated with a pit area of a gaming establishment. The ATMS includes an automatic tracking and management unit (ATMU) which transmits and receives information between all gaming tables in all pit areas and the gaming establishment database system. The ATMU provides for the interactive determination of various transactions within the pit area. Through the automatic tracking and management system the manual paper tracking activities associated with the pit area are eliminated, thereby freeing pit personnel for other tasks.

DETAILED DESCRIPTION OF THE DRAWINGS

The present invention relates to an improvement in the tracking of transactions in a casino. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
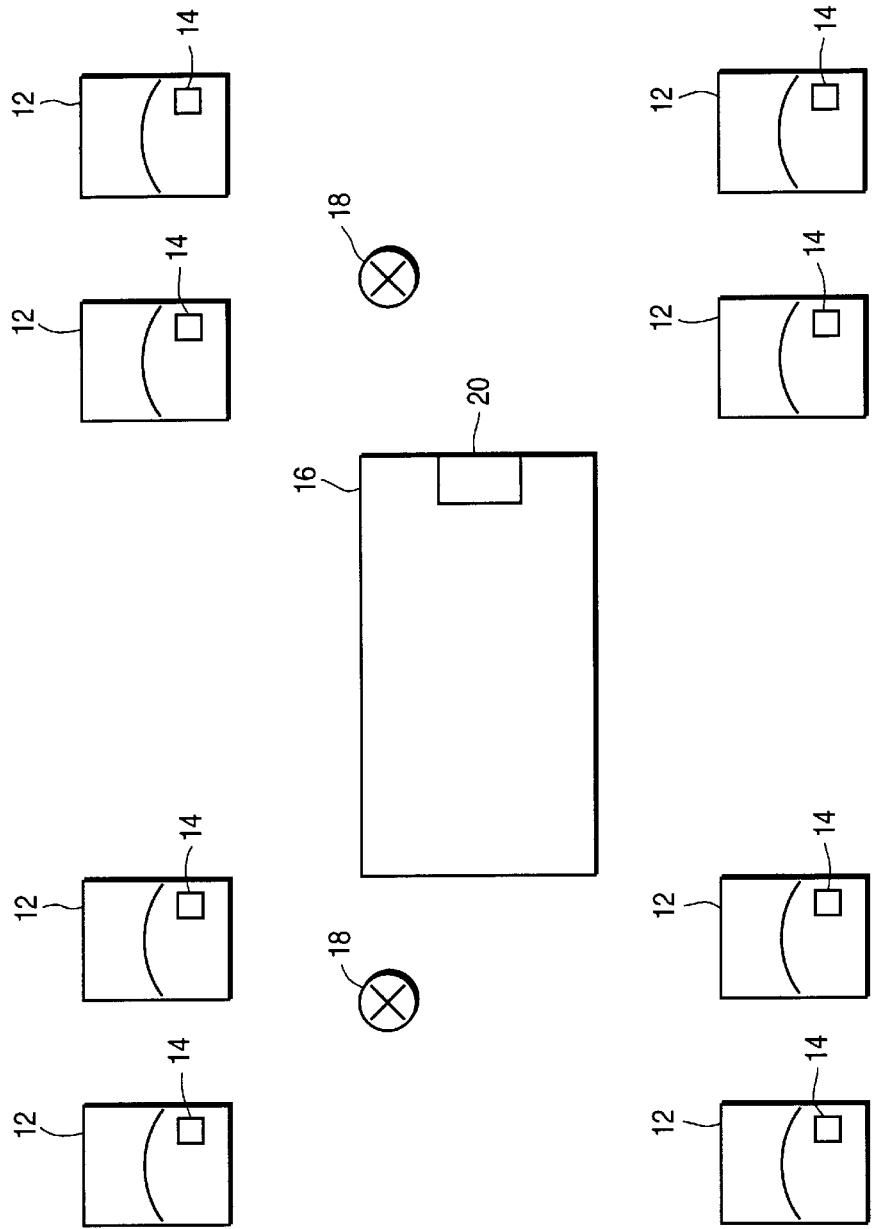
FIG. 1 is a block diagram of a first known tracking system for a pit area of a casino.

FIG. 1 is a block diagram of a first known tracking system for a pit area 10 of a casino. What is meant by a pit area is an area in which a variety of games are played, including blackjack, roulette and the like. In the pit area 10 there are included a plurality of gaming tables 12. Located on each of the gaming tables 12 typically is a transmitter 14 which provides signals to a receiver which is part of the database system in the casino. There is also a pit podium area 16 in which a pit terminal 20 is located. Pit personnel 18 determine the transactions being performed by the various players.

Figure 2:
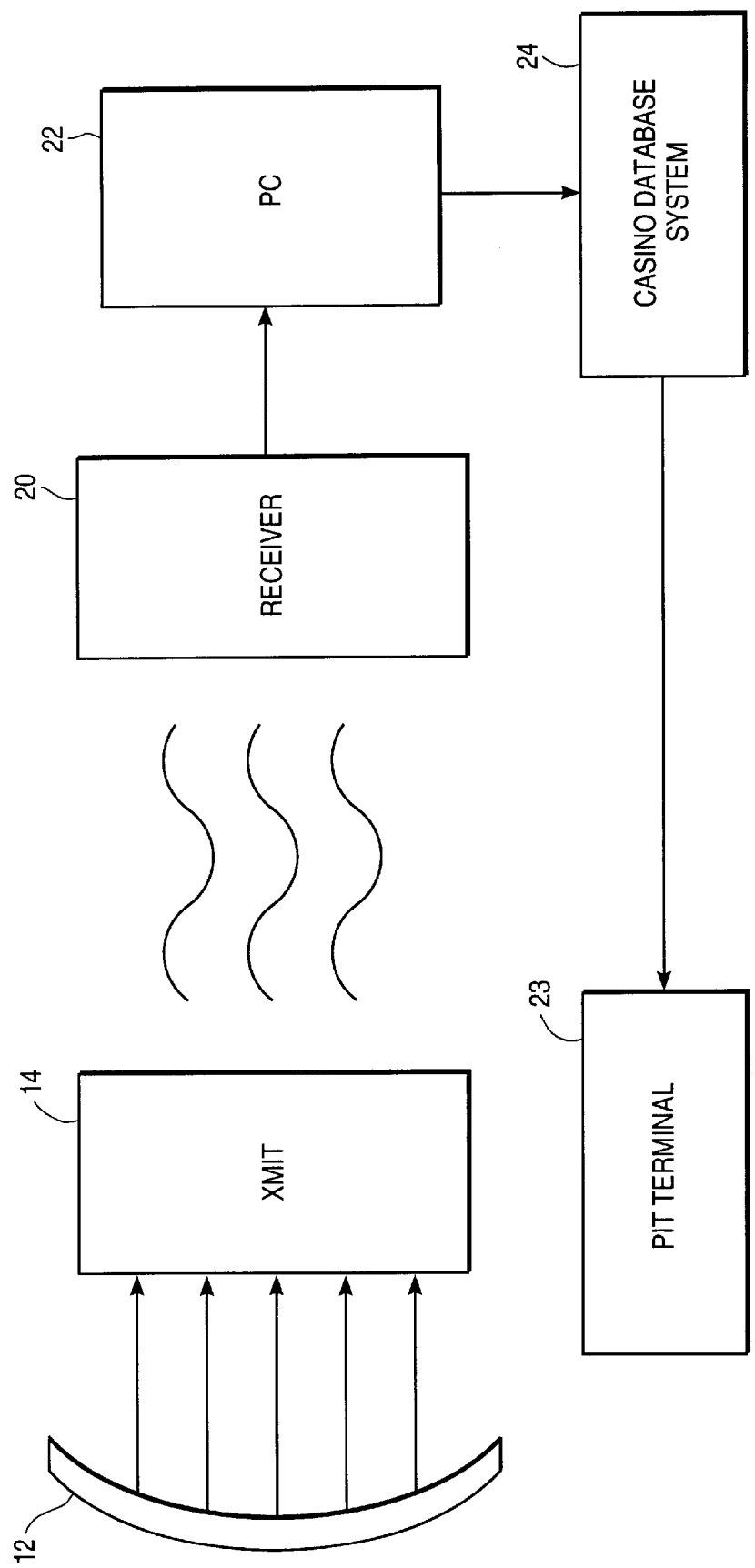
FIG. 2 is a block diagram of the tracking system of FIG. 1 utilized with one gaming table.

FIG. 2 is a diagram of the tracking system 10 shown coupled to one gaming table 12. As is seen from FIG. 1, there are several gaming tables 12 that are coupled within the tracking system 10 to provide information therefrom. A transmitter 14 at the gaming table 12 provides a signal (typically of radio frequency) to the receiver 20 which is located remotely in the casino offices. That signal is then provided to a personal computer (PC) 22 which in turn provides a signal to the casino database system 24 indicating the particular transaction.

The casino database system 24 then takes that transaction information and provides it to the pit terminal 23. The pit personnel 18 (shown in FIG. 1) are in the pit area to do a variety of tasks, (1) to provide security to the games, (2) to watch the transactions for betting and transaction levels and the like, and (3) to provide an interaction with the players to allow them to be comfortable in the environment. Since the pit personnel have to observe transactions by observing the monitors on a continuous basis, their ability to interact with the players is severely diminished.

In addition, this system is not bidirectional, that is, neither the pit personnel 18 nor the player really has any ability to change the betting levels of any transactions of the player. Finally, this system requires manual recordation of the betting to provide some type of player tracking and incentive awards. Accordingly, this system can give rise to some disputes and may not be completely accurate.

Figure 3:
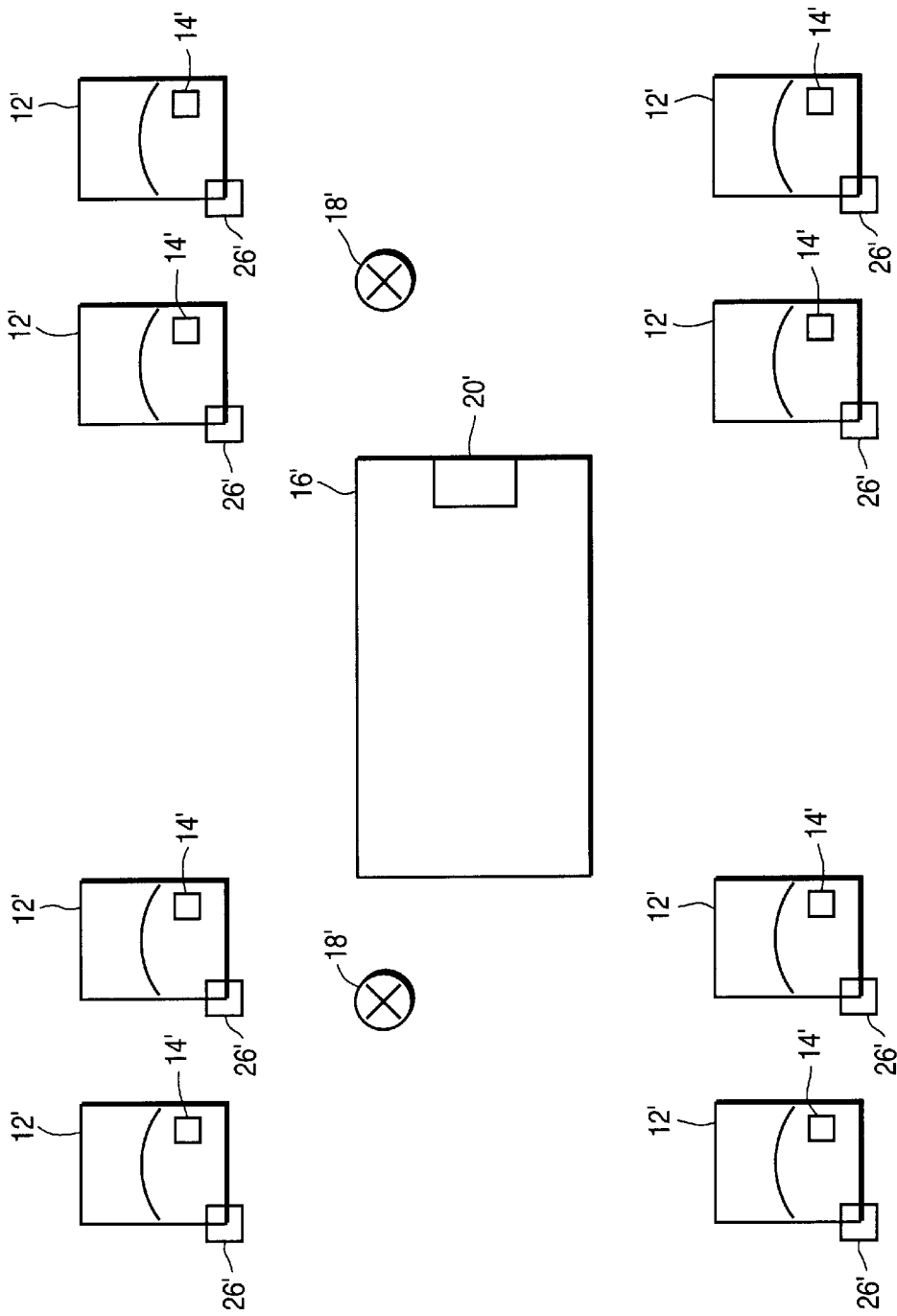
FIG. 3 is a block diagram of a second known tracking system for a pit area of a casino.

FIG. 3 shows a second known tracking system 10' which is very similar to FIG. 1 except that at each gaming table 12' there is a credit card terminal 26' in which there is a slot in which a tracking card can be run through. In this type of system, a player comes to a gaming table, provides the pit personnel with his/her tracking card. The pit personnel 18' place that tracking card into the terminal and the player can play until the player wishes to leave. Thereafter, the pit personnel 18' go back to the terminal and log the player out of the gaming table 12'.

The problems with this kind of system are (1) there is limited player interaction with the dealer/pit personnel. In addition, (2) this does not eliminate the paper rating slips that are required, and (3) because the player has to wait to be checked out of the game, they can be dissatisfied with having to wait for this service. Finally, the tracking system 10' still requires the manual betting rate system as described in the tracking system 10 of FIG. 1.

Figure 4:
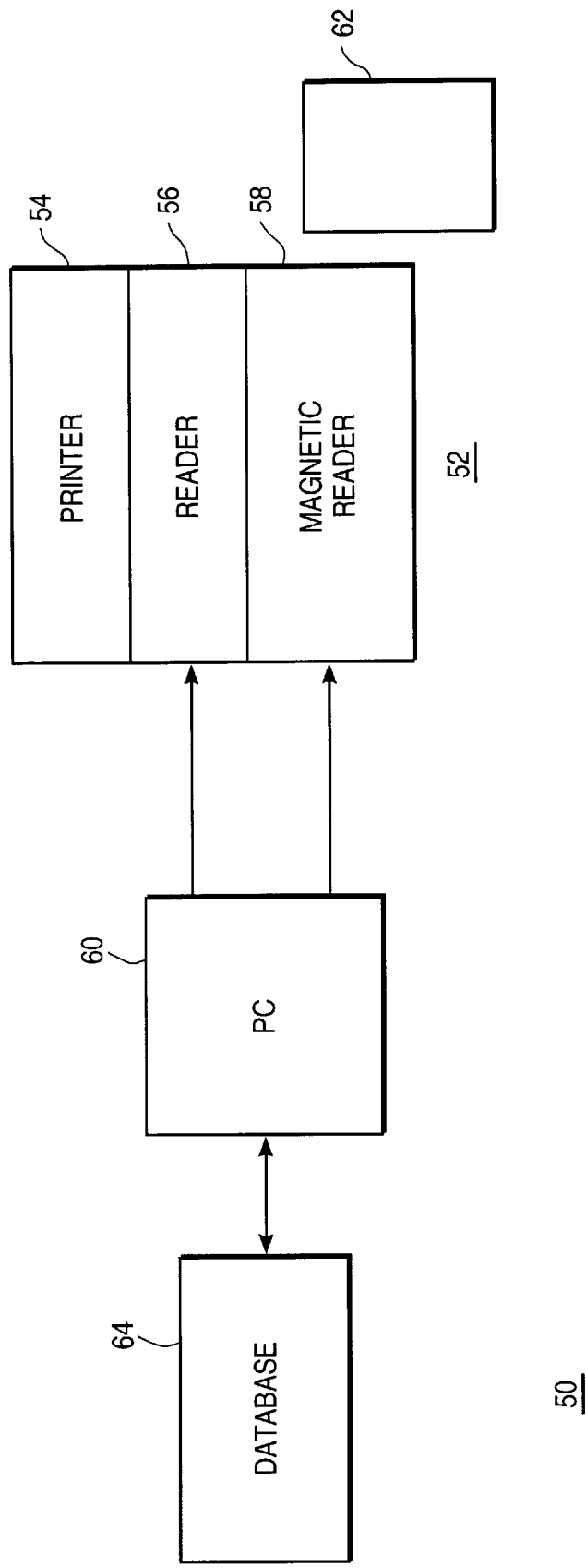
FIG. 4 is a block diagram of a third known tracking system for a pit area of a casino.

FIG. 4 shows a third known tracking system 50. In the tracking system 50 there is a still a paper-based system that automates the manual paper system of the other two known systems. The tracking system 50 includes a device 52 that comprises a printer 54, a scanning reader 56 and a magnetic reader 58. In the tracking system 50, the player would provide the pit personnel with a card which would be passed through the magnetic reader 58. The device 52 is coupled to a personal computer (PC) 60. The personal computer 60 in turn is coupled to a database system 64 associated with the device 52. The printer 54 would print a paper 62 which would include a mark (a circle or the like) that provides information concerning the player transactions. That information would then be provided to the scanning reader 56. The player transaction information then passes from reader 56 through the PC 60 to a separate data base which is not related to the casino database.

There are two problems with the tracking system 50, (1) instead of eliminating paper it actually adds an additional sheet of paper and still requires the manual tracking of bet rates. Secondly, because the tracking system requires its own database, this tracking system 50 would add considerable cost and complexity to an existing casino tracking system.

None of the above-identified known transaction tracking systems provide for automatic tracking of various transactions in a pit area of a gaming system. In addition the two known manual tracking systems shown in FIGS. 1 and 3 do not provide for management of the various player transactions to determine betting patterns and the like. Finally, the third known system, although providing some management functions, is still essentially a manual system and can potentially add significant cost and complexity to the overall tracking system because there is a separate database associated therewith.

Accordingly, an automatic tracking and management system is provided in accordance with the present invention, that allows the pit personnel to have more personal contact with the players and allows for automatic tracking of various transactions in the gaming area. In addition, through the use of a system in accordance with the present invention, interactive changes can be made in the pit area.

Finally, through the tracking and management system of the present invention the pit personnel no longer have to be concerned with time-wasting paper tracking and accounting systems. The tracking and management system is designed to be utilized in conjunction with an existing casino database to minimize any changes associated therewith.

Figure 5:
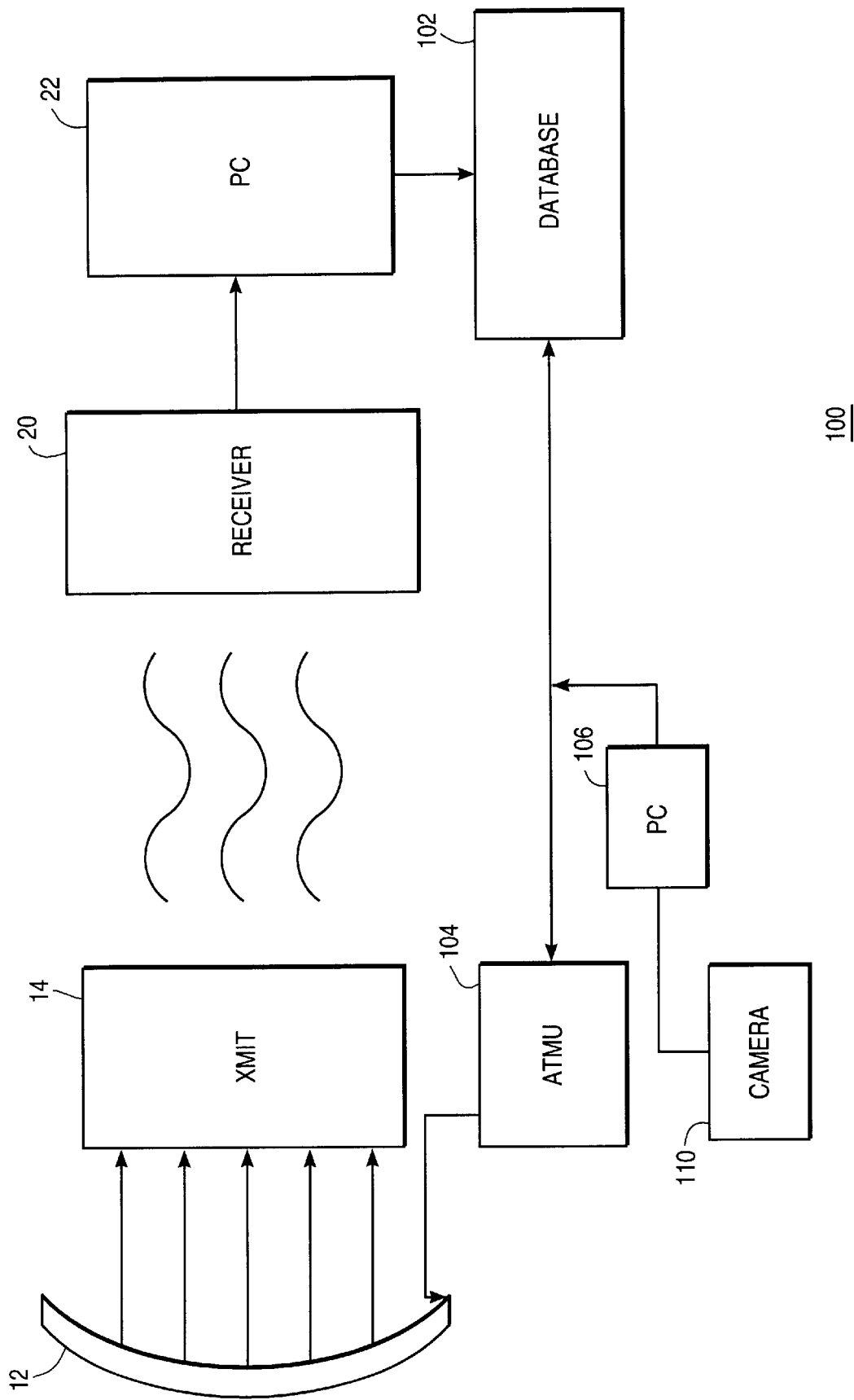
FIG. 5 is a block diagram of the automatic tracking and management system (ATMS) for a pit area of a casino in accordance with the present invention.

FIG. 5 illustrates the automatic tracking and management system (ATMS) 100. As is seen, the casino database 102 is coupled to an automatic tracking and management unit (ATMU) 104. The ATMU 104 in turn is also coupled to a PC 106, which can provide casino surveillance and act as a terminal emulator. The ATMU 104 is also coupled to the network. This connection can be made via Ethernet, token ring, RF signal or the like. Through the ATMS 100, tracking and management of different transactions can be provided that is automatic, more accurate and more accessible than previously known systems. A key component to the operation of the ATMS 100 is the ATMU 104.

Figure 6:
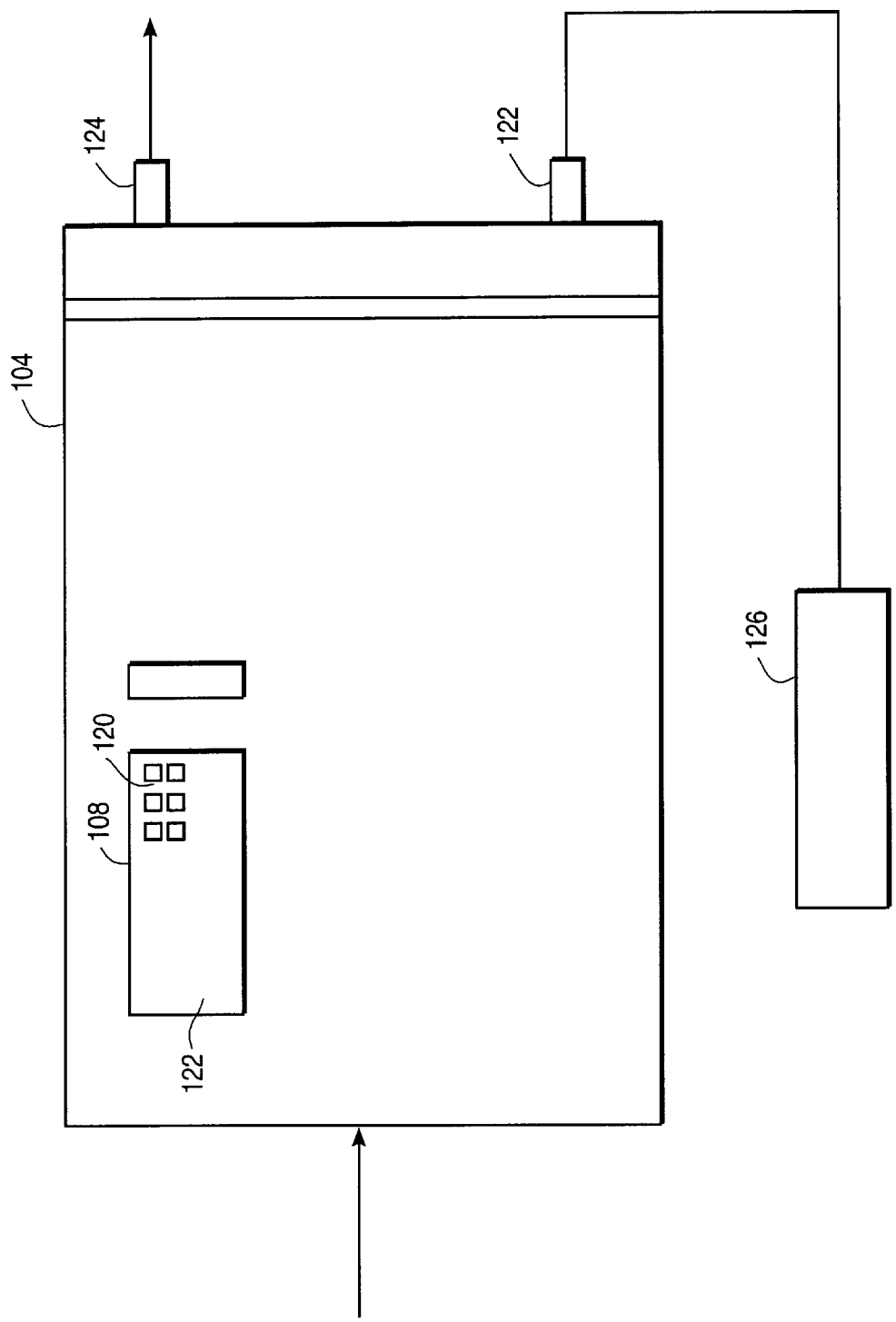
FIG. 6 is a diagram of an automatic tracking and management unit (ATMU) in accordance with the ATMS of FIG. 5.

FIG. 6 describes the ATMU 104 module, which includes a screen 108 for viewing various transactions in the pit area. The screen 108, in a preferred embodiment is a touchscreen. However, one of ordinary skill in the art readily recognizes that a keyboard, mouse or other device could be used to input information and/or to modify the information on the screen 108 and their use would be within the spirit and scope of the present invention. The screen 108 of the ATMU 104 as shown comprises a plurality of icons 120 which in this embodiment indicates the betting level of each player at the table. In addition, the screen also contains information about the players, such as their names, addresses and the like, shown generally at 122.

The information on the screen can be changed and customized for a particular player's pattern. Through standard techniques, information can be changed and configured to describe a particular transaction.

The ATMU 104, in a preferred embodiment, also includes an ethernet port 124 which is coupled to the casino system database 102 and an RS485 port 122 which is coupled to card readers 126. Further, in a preferred embodiment the ATMU 104 also includes a magnetic strip reader which is utilized to read cards with magnetic strips and a slot for reading hole-punched cards. Finally, in a preferred embodiment, the ATMU 104 includes a CPU, memory, a hard drive, various computer programs for allowing the operation of the various elements and an application program to provide for automatic tracking and management of transactions in the pit area of the casino.

Referring back to FIG. 5, an enhancement to the ATMS 100 of the present invention is the ability to now provide instant surveillance. In a preferred embodiment, there would be several of these type systems throughout the casino system. As is seen, a camera 110 is connected with the pc 106. Through the use of ATMU 104, pictures of the players could be generated instantaneously on a properly equipped pc 106 and transferred throughout the system.

The advantage of this type of surveillance is that in many instances there may be government regulations that require that when some maximum amount (i.e.,$10,000) is traded in one day by one individual at one casino, that must be reported to the government. One of the issues associated with this is that an individual that might attempt to transact large amounts of money in a single casino and also may not want his or her identity to be revealed. However it is known that in some cases even though the player was performing an illegal act by not reporting the transaction, the casino could be held similarly liable and could, therefore, lose it's license. Hence it is important that the casino attempt to recognize those individuals who are attempting to act in such a manner.

Through this surveillance system this picture can be transmitted throughout the casino. If a person, for example, did not present an identification of some sort, the picture itself could be compared to the person to determine whether he or she is a person who should or should not be playing in the casino because of excessive amounts of money spent. In addition, there may be other reasons where surveillance is very important. This system would provide the ability to prevent a known criminal or person who is not desired in the casino from betting in that establishment.

The important features and elements of the ATMS 100 in accordance with the transaction tracking are described herein below. The ATMS 100 provides several advantages over the known systems described in FIGS. 1–4. Firstly, no paper is required; there is no betting slip, no bet rating and the system is completely automated.

In addition, the transaction tracking system allows for tracking not only individual transactions but also (under certain circumstances) allows for the tracking of a particular individual and provides for demographic information and the like. Finally, since the ATMS 100 can interact closely with the casino database, it can provide for fraud detection, surveillance, and the like.

To more particularly describe the advantages of the ATMS 100 of the present invention, refer now to FIGS. 7 through 12 which are flow charts of the various features associated with the pit tracking system of the present invention.

Figure 7:
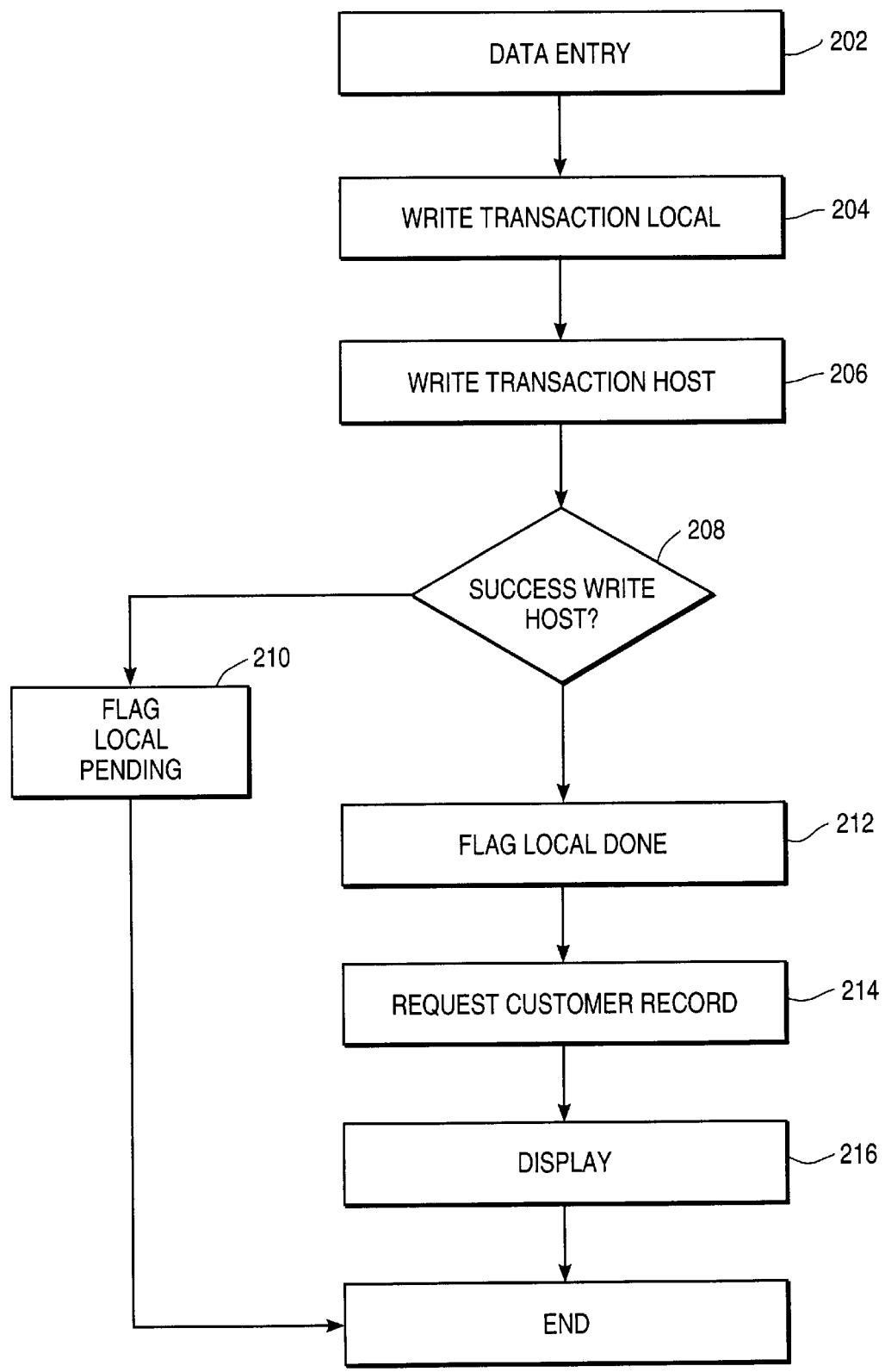
FIGS. 7 and 8 are flow charts showing the operation of incoming and outgoing player transactions in accordance with the ATMS of FIG. 6.
Figure 8:
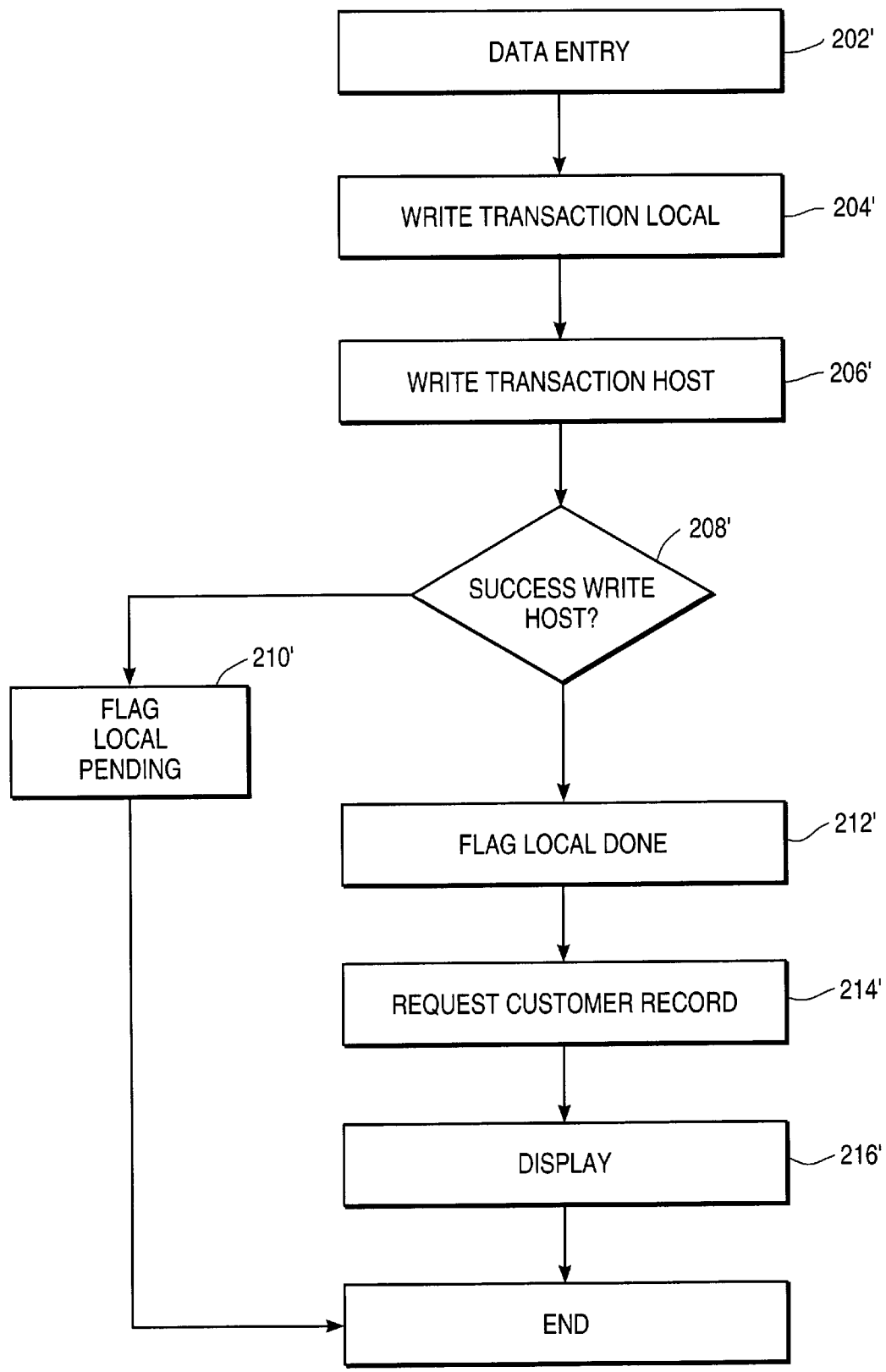

FIGS. 7 and 8 are flow charts of the operation of the tracking system when tracking incoming and outgoing player transactions, respectively.

FIG. 7 shows how data is entered into the tracking system via step 202. Data can be entered in a variety of ways. For example, data can be entered via a keyboard, a card being read, touching the screen, a pointing device or the like.

Thereafter, the transaction is written locally at the gaming table via step 204. Next, the transaction is written to the host via step 206. A determination is then made as to whether the data has been written to the host, via step 208. If data has not been written successfully, then a flag indicates that the entry is pending via step 210. If the write is successful, then a flag indicates that entry is complete via step 212. Thereafter, the player's record is requested via step 214 and the record is displayed via step 216.

FIG. 8 is an outgoing player transaction tracking flow chart. The steps are substantially the same as for the incoming player with the exception that at the last step 216' the display is cleared.

The outgoing transaction contains more information of importance to the owner for related player betting patterns and the like, allowing the casino owner to determine ways to ensure that the player will return.

Typical information associated with outgoing transaction tracking includes but is not limited to:
1. Player I.D.
2. In Time
3. Out Time
4. Elapsed Time
5. Average Bet
6. Total Cash Buckets
   (a) Money play
   (b) Marker buybacks
   (c) Chip buy ins
   (d) Foreign Checks
7. Betting Range The incoming tracking transaction information is utilized to allow for graceful recovery from systems or power failures.

Typical information associated with incoming player transaction tracking includes but is not limited to:
1. Player I.D.
2. In time
3. Average Bet Through this transaction tracking arrangement, a summary of a player's transactions can automatically be provided to the casino database system or it can be accumulated in the pit area.

There are many types of transactions that may be tracked utilizing the ATMS 100. For example, the head count within the pit area might be tracked over a predetermined period of time. In another example, the total amount of cash transactions may be tracked or finally marker requests or the like might be tracked.

Figure 9:
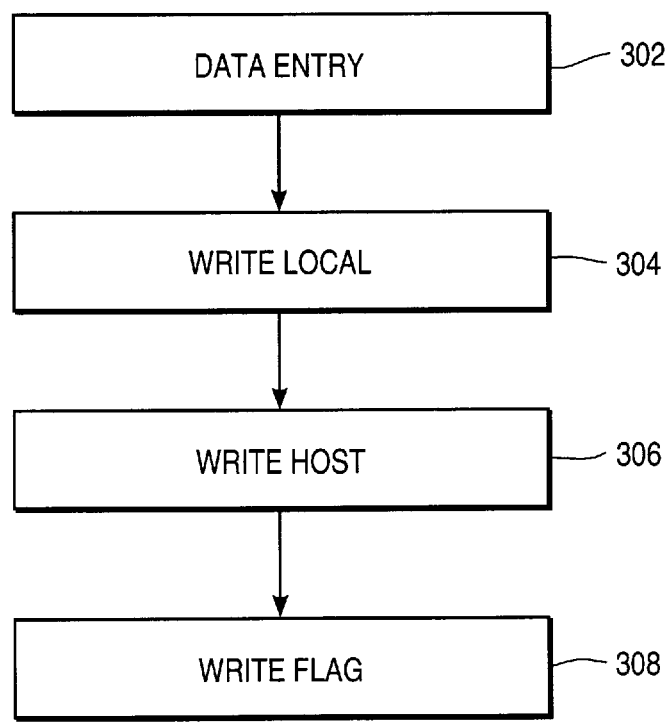
FIG. 9 is a flow chart tracking various transactions of a pit area in accordance with the ATMS of FIG. 6.

FIG. 9 is a flow chart for tracking these types of transactions. As is seen, the data relating to the transactions are entered, via step 302. This transaction information is written to the local, via step 304, and then written to host, via step 306. Thereafter, a flag indicating that the new information has been entered is updated, via step 308.

BANK ROLL TRANSACTIONS

Bankroll transactions are utilized to ensure that a player and/or game has enough credit or chips to continue play. Before the games run out of chips or credits, the pit boss must stop the games to complete a fill request, which will also halt revenue until a fill request is received. Through the ATMS 100, this is done automatically upon the entry of the proper information into the ATMU. Some typical information related to such transactions are:
GAME NUMBER
GAME TYPE
TOTAL AMOUNT
DENOMINATION AMOUNT
TYPE (CREDIT/DEBIT)

Figure 10:
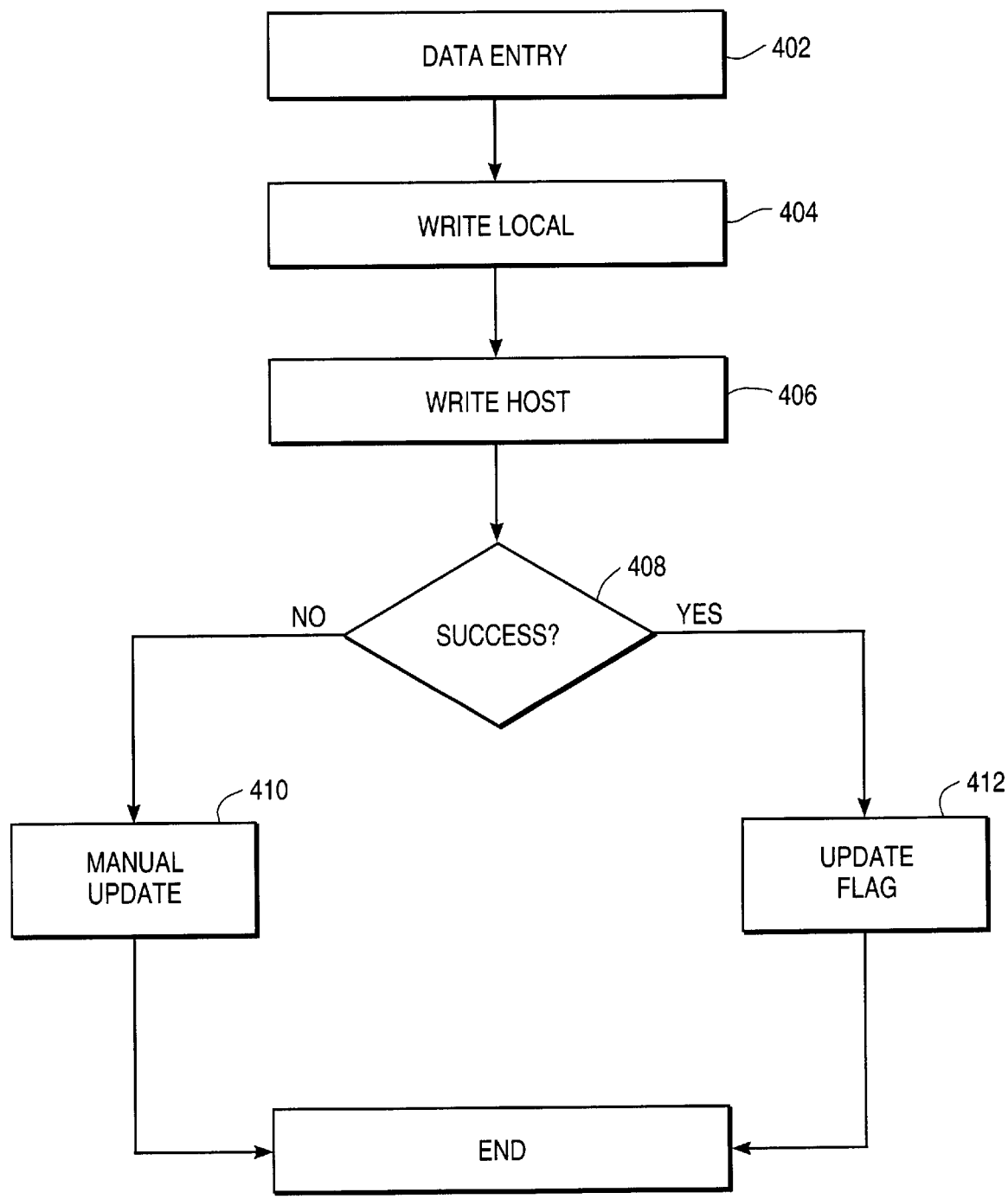
FIG. 10 is a flow chart showing the tracking of bankroll transactions in accordance with the ATMS of FIG. 6.

FIG. 10 is a flow chart showing the operation of the system for a bankroll transaction. Unless the bankroll transaction information has been written to the host, no further transactions can take place. The data relating to the bankroll transaction are entered via step 402. This transaction information is written to the local, via step 404 and then written to the host, via step 406. Next, it is determined if the transaction information has been successfully written to the host, via step 408. If the answer is yes, then the flag indicating that the bankroll is complete is updated, via step 412. If the answer is no, then the bankroll transaction is manually updated, via step 410.

The above-identified transaction tracking is described for illustrative purposes only. One of ordinary skill in the art readily recognizes that there are many other types of transactions that can be tracked and managed in accordance with the present invention.

One of the features of the present invention is to ensure that the casino data base system (host) is in synchronization with the ATMU (local).

Figure 11:
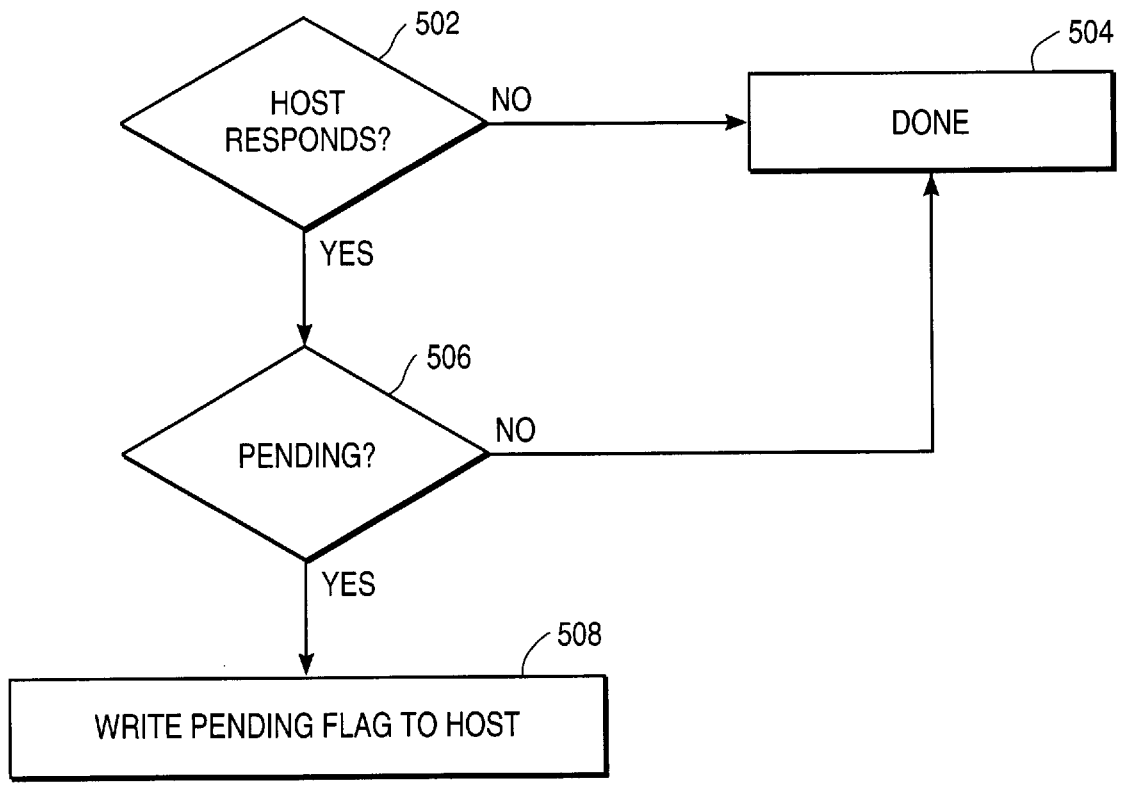
FIG. 11 is a flow chart showing the tracking of a database synchronization in accordance with the ATMS of FIG. 6.

FIG. 11 is a flow chart for synchronizing the casino database with the ATMU 104.

Accordingly, for each transaction, the ATMU 104 determines if the host (data base) is responding, via step 502. If the host is not responding, then the ATMU 104, via step 504, does nothing further. If the host does respond, the ATMU 104 determines if there are any transactions that are pending via step 506. If there are no transactions pending, the ATMU 104 does nothing further, via step 504. If there are transactions pending, then all the pending transactions are written to the host, via step 508.

Another feature is the look up function related data base. In this feature, the ATMU 104 can look up and retrieve certain information from the data base and retrieve information to the screen. For example, an individual's name, home address, birth date or the like, that is resident within the data base is obtained and displayed by the ATMU 104. This will allow the casino owner to have increased flexibility when dealing with a particular player.

BET RECOGNITION

Figure 12:
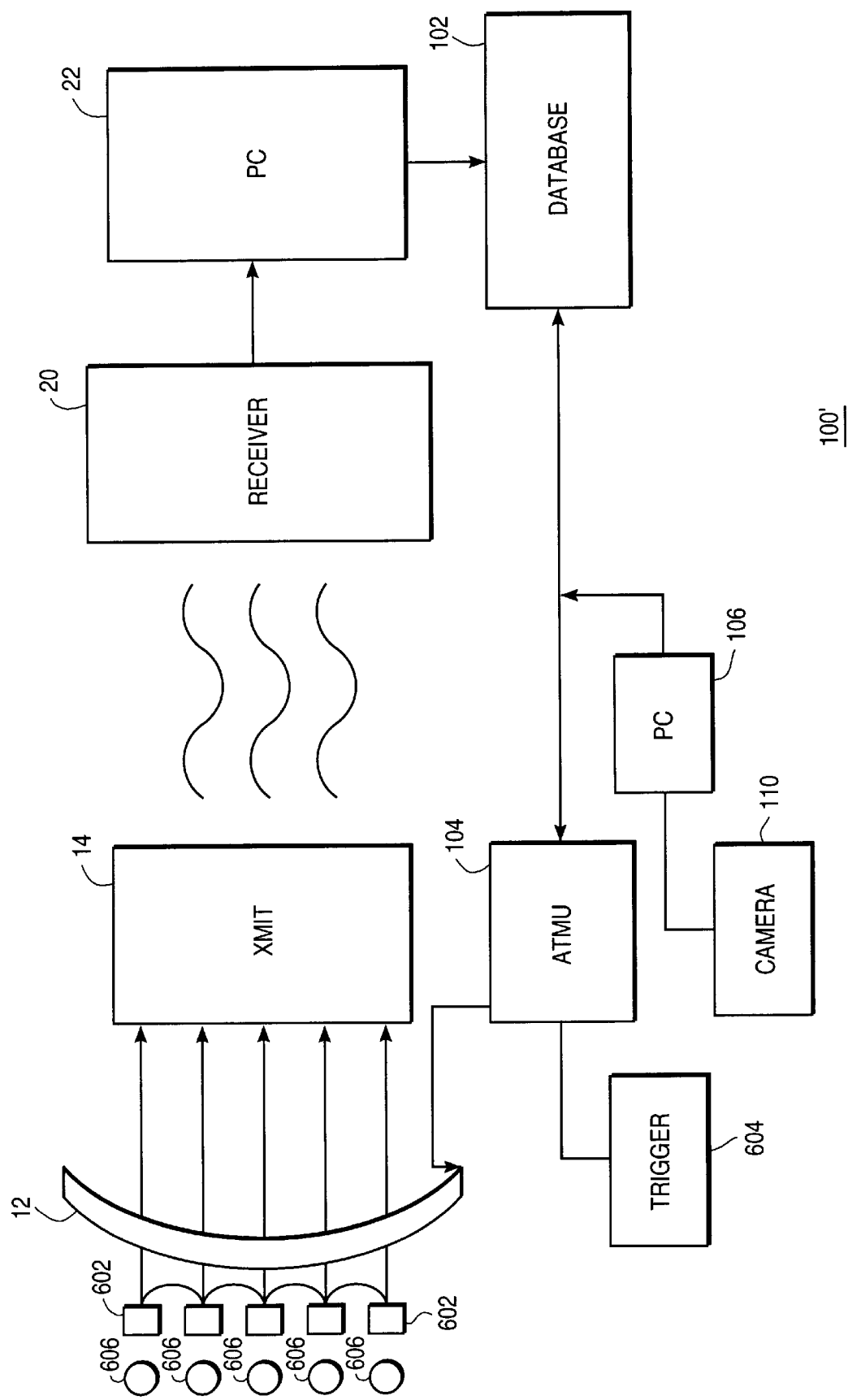
FIG. 12 is a block diagram showing a gaming table coupled to the ATMS of FIG. 6 including means for recognizing bets.

At the present time, known tracking systems do not provide an indication of individual bet transactions. FIG. 12, is a block diagram of an ATMS 100' which is substantially similar to the system 100 except that it includes a plurality of readers 602 and a trigger mechanism 604 for bet recognition.

Each of the readers 602 responsive to the trigger mechanism 604 provides each of the individual bet transactions of chips 606 or the equivalent, by a particular player.

Figure 13:
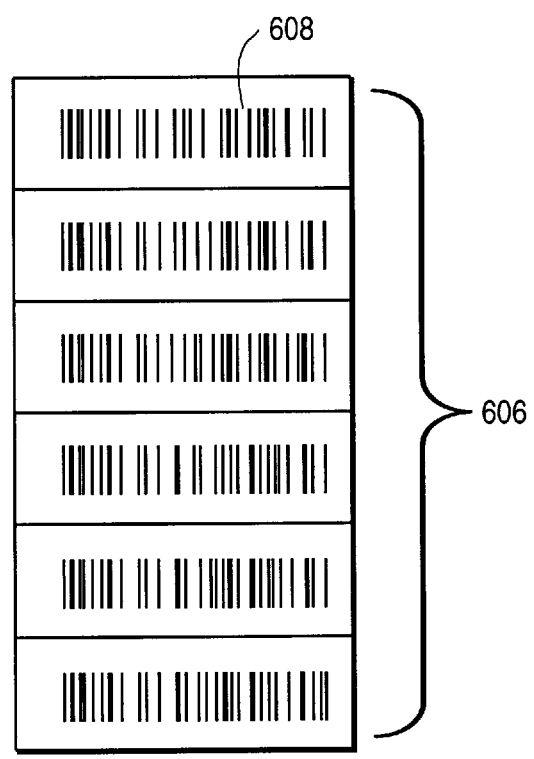
FIG. 13 shows a diagram of a stack of bar-coded casino chips.

FIG. 13 shows, in a preferred embodiment, a stack of chips 606. The information associated with the transaction is read by utilizing encoding such as a bar code 608 or the like located on the chips 606. It should be recognized that there are a variety of other types of ways that the encoding could take place, which would be within the spirit and scope of the present invention.

Hence, through the actual tracking of the spending patterns of players, each bet would be recognized. In so doing, many disputes concerning the amount of transactions could be eliminated, particularly in those instances where these transactions are utilized for providing other incentives for the player.

CONCLUSION

Through the automatic tracking and management system in accordance with the present invention, an automatic tracking of a variety of factors can be accomplished. Through this system the tracking is automatic, reduces paper and also provides features that heretofore have not been provided. Accordingly, the system in accordance with the present invention provides many advantages over previously known systems.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. An automatic tracking and managing system for use in a gaming establishment, comprising:

a casino database that stores betting summary records for each of a plurality of players, each betting summary record associated with a player identification code, the betting summary record of a player including the player's betting rating;

a gaming table having a plurality of player positions and a plurality of code readers, each code reader initiating a betting session in response to reading a player identification cards encoded with a player identification code;

a communications network; and an automatic tracking and managing unit (ATMU) including a display unit, and coupled to the casino database via the communications network, and coupled to the code readers at the gaming table to receive from a code reader a player identification code for a player at a position at the gaming table at the initiation of a betting session, and to retrieve from the casino database in response thereto the betting summary record associated with the player identification code, and to display the betting summary record of the player to pit personnel at the gaming table on the display unit, the ATMU collecting real time data of the player's betting transactions at the gaming table, the real time data including the player's identification code read from the player identification card, and an average bet by the player during the betting session, and updating the betting summary record with the collected real time data for the player, and providing the updated betting summary record to the casino database via the communications network.

2. A system for automatic tracking and management of information generated in a gambling establishment including a plurality of gaming tables each with a plurality of betting positions, the system comprising:

a transmission unit that receives information transmitted from each of the betting positions and transmits the information to a first computer, the information including:

a player rating indicating a past betting frequency and a past betting level; and information regarding current betting transactions at a gaming table, including a current betting level and a current betting frequency;

a database coupled to the first computer that stores and processes information received by the first computer;

a second computer coupled to the database and to a camera for receiving an image of a player;

a data entry device that receives commands and data; and a display device that displays information requested through the data entry device, including the information transmitted to the first computer and information processed by the database.

3. The system of claim 2, wherein the data entry device and the display device comprise a touch screen.

4. The system of claim 3, wherein a user changes a player's rating by using the touch screen.

5. The system of claim 4, wherein the user initiates a rating session for a player by entering the player's identity using the touch screen, and wherein initiation of a rating session accesses a player record in the database.

6. The system of claim 2, further comprising a magnetic card reading device that reads information unique to a player from a player card, the information comprising:
   the player rating;
   an identity of the player;
   a credit limit of the player; and
   wherein placing the player card in the magnetic card reading device initiates a rating session and accesses a player record in the database.

7. The system of claim 6, wherein the display device displays information read from the player card.

8. The system of claim 2, further comprising a network port through which the data entry device and the display device are coupled to a plurality of data entry devices and display devices at a plurality of gaming tables.

9. The system of claim 2, wherein the database stores a betting history of a player comprising betting frequencies and betting levels from past sessions and betting frequencies and betting levels from a current session based on information received from the first computer.

10. The system of claim 2, wherein the camera transmits images of players to the database for verification of identity.

11. A method for tracking and managing information relating to multiple, simultaneous gambling transactions, comprising the steps of:
   storing data relating to a plurality of players in a database associated with a gambling establishment, the data comprising for each player a player identification code of the player and the player's betting rating;
   reading a player identification card encoded with the player identification code of the player in a code reader at a gaming table;
   transmitting the read player identification code to the database to access the stored data of the player having the read player identification code;
   initiating a betting session for the player at the gaming table in response to reading the player identification code;
   displaying the stored data on a display device in an area of the gaming table;
   collecting real-time data of the player's betting transactions through an automatic tracking and management system (ATMU) during the betting session, the data comprising:
      the player identification code;
      the player's current gambling transaction;
      the player's number of transactions per unit time; and
      the player's betting level per betting transaction;
   transmitting the real-time data to a local storage device associated with a locality in a gambling establishment;
   transmitting the real-time data to the database; and
   processing the real-time data, including updating the stored data of the player based on the real-time data.

12. The method of claim 11, further comprising the steps of storing the real-time data in a local storage device associated with a gambling table.

13. The method of claim 12, wherein the betting session is initiated by reading the player's identity from a magnetic strip of a player card and transmitting the information to the database via the ATMU.

14. The method of claim 11, further comprising the steps of:
   storing a betting transaction type and a betting level for each betting transaction by the player during a betting session; and
   storing decrements from the player's compensation account.

15. The method of claim 11, wherein the betting session is initiated by entering the player's identity on a touch screen of the ATMU.

16. The method of claim 11, further comprising the step of transmitting a real-time photographic image of the player to the database for identification.

17. The method of claim 11, further comprising the steps of tracking the availability of gambling tokens at a gaming table by:
   automatically recording additions to and subtractions from a gambling token supply by transferring image recognition data to the database via the ATMU;
   receiving a signal on the display device of the ATMU that no further transactions can take place until the image recognition data is received by the database; and
   receiving a signal on the display device of the ATMU that indicates whether sufficient gambling tokens are present to allow gambling to continue.

18. The method of claim 11, further comprising the steps of tracking the available credit of the player at a gaming table by:
   automatically recording each betting transaction by the player;
   determining an available credit of the player as a result of a betting transaction; and
   receiving a signal on the display device of the ATMU that indicates whether the player possesses sufficient available credit to allow the player to continue betting.

* * * * *